Jan. 10, 1939.　　　M. S. MOORE　　　2,143,789
LOADING MACHINE FOR MINES
Filed July 13, 1937
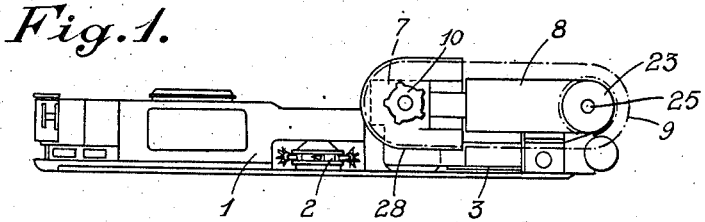
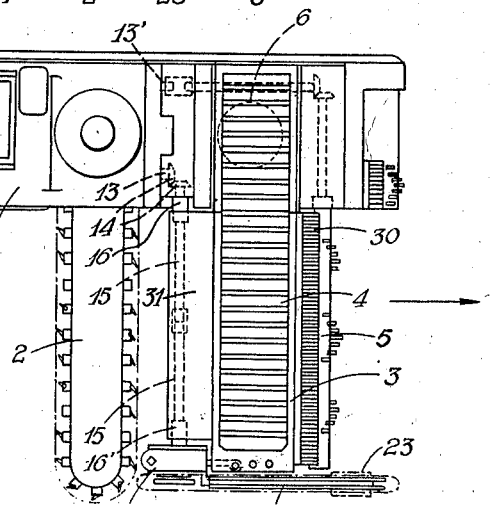
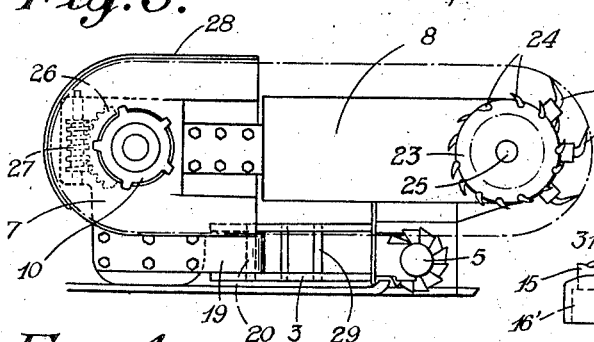
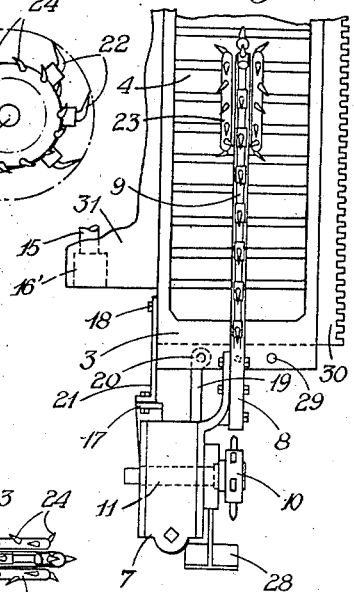
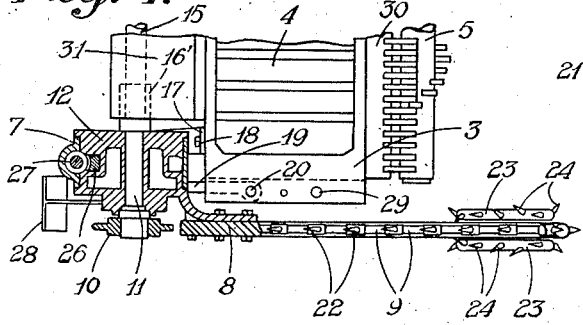
M. S. Moore
INVENTOR
By: Glascock Downing & Seebold
ATTYS.

Patented Jan. 10, 1939

2,143,789

UNITED STATES PATENT OFFICE 2,143,789

LOADING MACHINE FOR MINES

Matthew Smith Moore, Malvern, England, assignor of one-half to The Mining Engineering Company Limited, Worcester, England, a British company Application July 13, 1937, Serial No. 153,408
In Great Britain July 20, 1936

9 Claims. (Cl. 262—30)

This invention relates to loading machines for use in mines, more particularly coal mines, and it has reference to machines of the type in which an outwardly projecting loading device comprises a loader bar co-operating with a conveyor arranged alongside thereof.

In a machine of this type, as disclosed in Patent No. 2,031,544, I have proposed to provide the end section of the loader bar with cutter picks in order to lessen the resistance to the progress of the machine under the broken or partly broken down material, along the cut previously made by the usual cutter means. While such an arrangement is very efficient, it throws at times a heavy load on the revolving bar.

An object of my present invention is to provide the loading device of such a machine with shearing means in order to facilitate the progress of the machine while relieving the loader bar of extra work, a further object being to mount a shearing jib on the loading device in such manner that it shall not interfere with the freedom of movement of the machine when it is not in operation. It has already been proposed to provide shearing means adapted to make vertical cuts in coal, and also to use such means in conjunction with belt conveyors in parallel relation thereto.

In accordance with my invention, I provide at the end of the loader device a vertically arranged shearing device which extends across the end of the conveyor and is adapted to make a vertical cut in the coal or other material to be loaded. Said shearing device may conveniently comprise a chain jib adapted to be mounted on the end of the loader frame by means of a supporting bracket.

The shearing device may be driven from a shaft projecting from the machine casing alongside the conveyor. Two shafts are conveniently provided, one on each side of the machine casing for driving the loader bar and the shearing chain respectively. This arrangement permits of reversing the drives when the direction of operation of the machine is reversed, to suit loading in both directions.

Preferably the bracket forming the support for the shearing jib is pivoted on the loader frame so that it can be swung into alignment with the machine.

These and other features of my invention will be more particularly described hereinafter, with reference to the accompanying drawing illustrating an embodiment of my said invention.

In the drawing:

Fig. 1 is a side elevation and

Fig. 2 a plan view of a loading machine fitted with a shearing device in operative position.

Fig. 3 is a side elevation of the shearing device drawn to a larger scale,

Fig. 4 is a corresponding plan view, the supporting bracket for the shearing mechanism being shown in section.

Fig. 5 is a plan view showing the shearing device in inoperative position.

Referring to the drawing, 1 is the main casing or frame of the machine, 2 the cutter jib and 3 the loader frame which carries a belt conveyor 4 and a comb 30 adapted to cooperate with a loader bar 5. The loader frame is pivoted to the main frame at 6 and adapted to be swung into alignment with the machine for flitting.

To the end of the loader frame 3 is secured a bracket 7 carrying a chain jib 8 extending in a vertical plane across the end of the frame 3 and forwardly thereof. A chain 9 on said jib is driven from a sprocket wheel 10 on a short shaft 11 journalled in a bearing 12 in the bracket 7. Said shaft 11 is driven from a shaft 13 on one side of the machine frame 1 through bevel wheels 14, shaft 15, and flexible couplings 16, 16'. On the other side of the machine frame 1 is a shaft 13' adapted to drive the conveyor 4 and loader bar 5.

The bracket 7 in the example illustrated is secured to the end of the frame 3 at two points. Rigid with the bracket are a lug 17 bolted to the frame 3 at 18, and an arm 19 pivotally engaging a pin or bolt 20 secured to the frame 3. When the bolt 18 is withdrawn, the pin 20 is adapted to act as a pivot to allow of the bracket with the jib being swung into alignment with the conveyor as shown in Fig. 5. This is of advantage when the conveyor is swung into alignment with the machine for flitting, any overhang beyond the width of the machine then being avoided. By means of an angle piece 21 bolted to the lug 17 and to the frame 3 at 18 the bracket 7 may conveniently be locked in this position.

In operation, the machine advancing in the direction of the arrow (Fig. 2), the shearing chain 9 moves ahead of the loader bar and cuts its way through the coal broken down or adhering to the wall. The chain 9 is provided with cutters 22 of any suitable type. In addition to these cutters, I preferably provide on each side of the jib, a disc 23 also fitted with cutters 24 on its periphery. The discs 23 are rotated by the chain, being rigid with the sprocket shaft 25 at the forward end of the jib. They provide clearance for the flat sides of the jib which, should the machine tend to "yaw" or move sidewise might jam against the solid coal.

It may be desirable to adjust the angular position of the chain jib, or to swing the chain in a vertical plane. To that end, as shown in Fig. 4, the jib 8 is secured to the bearing member 12 which itself is rotatably mounted in the bracket 7. On the bearing member 12 I provide a toothed sector 26 in mesh with a worm 27, which may be operated by hand or in any desired manner. 28 is a guard surrounding the rear portion of the shearing chain.

The construction illustrated is such that the bracket 7 and jib 8 can be reversed to suit loading in opposite directions. The comb 30 and guard 31 are interchangeable while the bracket 7 with the jib are adapted to be disconnected from the pivot pin 20, and connected in reversed position to a pivot pin 29 symmetrically arranged on the other side of the frame 3.

The shearing gear according to my invention may also be used with machines arranged for simultaneous cutting and loading, or machines having two loader bars; the drives then may be taken alternately from either gear box.

I claim:

1. In a loading machine for mines, the combination with a machine casing, of a loader frame projecting from said casing, a conveyor in said frame, a loader member extending longitudinally of said frame, a vertical shearing device pivotally mounted at the outer end of said frame, means for locking said shearing device in a position at right angles to said frame, and means for locking said shearing device in a position parallel with said frame.

2. In a loading machine for mines, the combination with a machine frame, of a loader frame pivoted to said machine frame, said loader frame projecting laterally from said casing in operative position, a vertical shearing device supported at the end of said loader frame, means for locking said shearing device in an operative position at right angles to said loader frame, and means for locking said shearing device in an inoperative position in alignment with said loader frame.

3. In a loading machine for mines, the combination with a machine frame, of a loader frame pivoted to said machine frame, a conveyor in said loader frame, a bracket pivotally mounted on the end of said loader frame, a vertical shearing mechanism on said bracket, and means for locking said bracket in either of two positions at right angles to one another.

4. In a loading machine for mines, the combination with a machine frame, of a loader frame pivoted to said machine frame, a conveyor in said loader frame, a bracket pivotally mounted at the end of said loader frame, a shearing jib supported vertically in said bracket, means for vertically swinging said shearing jib, means for securing said bracket with said jib in a position at right angles to said conveyor, and means for securing said bracket with said jib in a position in alignment with said conveyor.

5. In a loading machine for mines, the combination with a machine frame, of a loader frame projecting laterally from said machine frame, a conveyor in said loader frame, a bracket removably secured to the end of said loader frame, a shearing jib mounted in said bracket, said bracket and said jib being reversible to suit loading in both directions.

6. In a loading machine for mines, the combination with a machine frame, of a loader frame projecting laterally from said machine frame, a conveyor in said loader frame, a bracket supported at the outer end of said loader frame, a detachable pivotal connection between said bracket and said loader frame, a bearing piece rotatably mounted in said bracket, a jib secured to said bearing piece, a cutter chain on said jib, said bracket, said bearing piece and said jib being reversible, and means journalled in said bearing piece for driving said cutter chain.

7. In a loading machine for mines, the combination with a machine frame, of a loader frame projecting laterally from said machine frame, a belt conveyor in said loader frame, a loader bar on one side of said loader frame, a flexible shaft on the other side of said loader frame, a bracket mounted at the outer end of said loader frame, a jib pivotally supported in said bracket, a cutter chain on said jib, said jib and chain when in operative position extending vertically across the end of said loader frame, and a driving connection between said flexible shaft and said cutter chain.

8. In a loading machine for mines, the combination with a machine frame, of a loader frame projecting laterally from said machine frame, a conveyor in said loader frame, a bracket mounted at the outer end of said loader frame, a jib supported in said bracket, a cutter chain on said jib, a cutter disc on each side of said jib, and means for driving said cutter chain and said cutter discs.

9. In a loading machine for mines, the combination with a machine frame, of a loader frame projecting laterally from said machine frame, a conveyor in said loader frame, a bracket mounted at the outer end of said loader frame, a jib supported in said bracket, a sprocket wheel journalled in said bracket, a sprocket wheel journalled in said jib, a cutter chain in operative engagement with said sprocket wheels, and a cutter disc on each side of and rigidly connected to the last mentioned sprocket wheel.

MATTHEW SMITH MOORE.